Aug. 19, 1958 C. ALLANDER ET AL 2,848,061
DUST SEPARATING AGGREGATE OF SMALL-CYCLONES
Filed Oct. 22, 1956 2 Sheets-Sheet 2
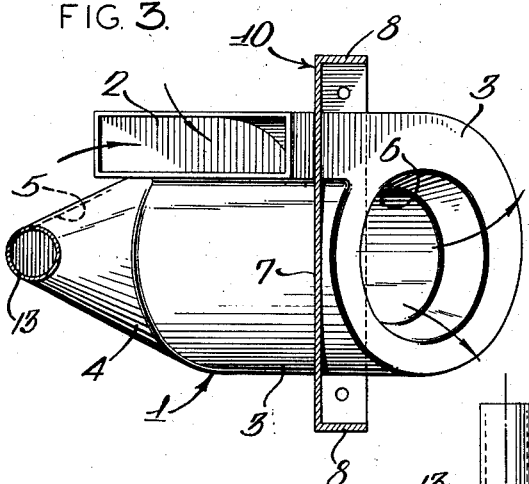
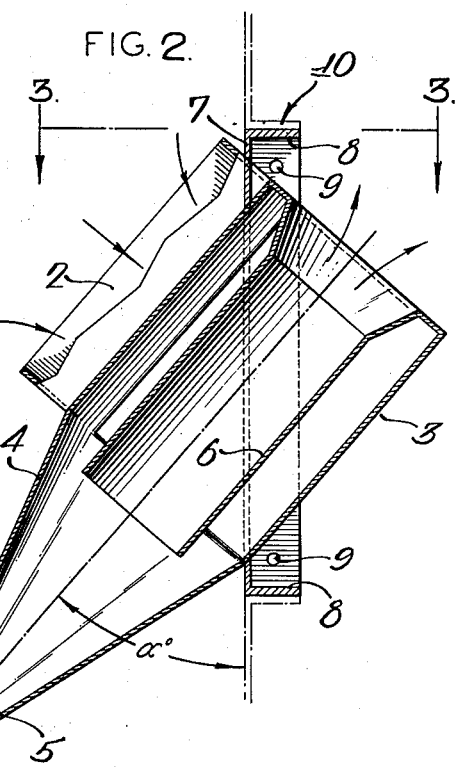
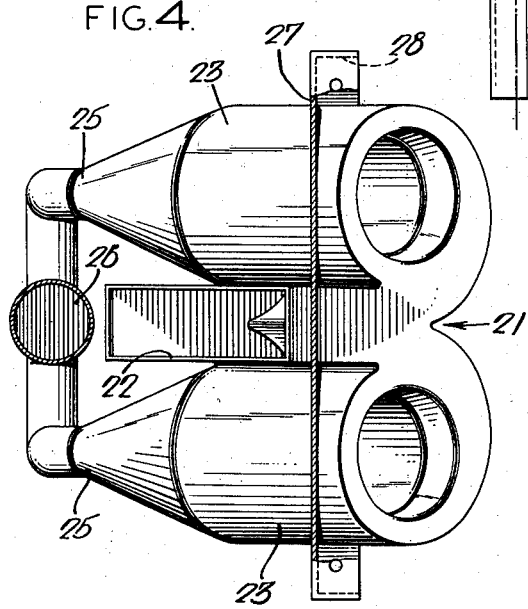
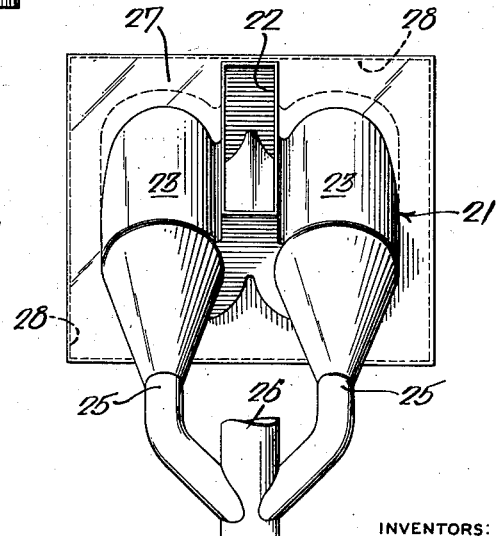
INVENTORS:
CLAES ALLANDER
BENGT LANNE
BY Howson & Howson
ATTYS.

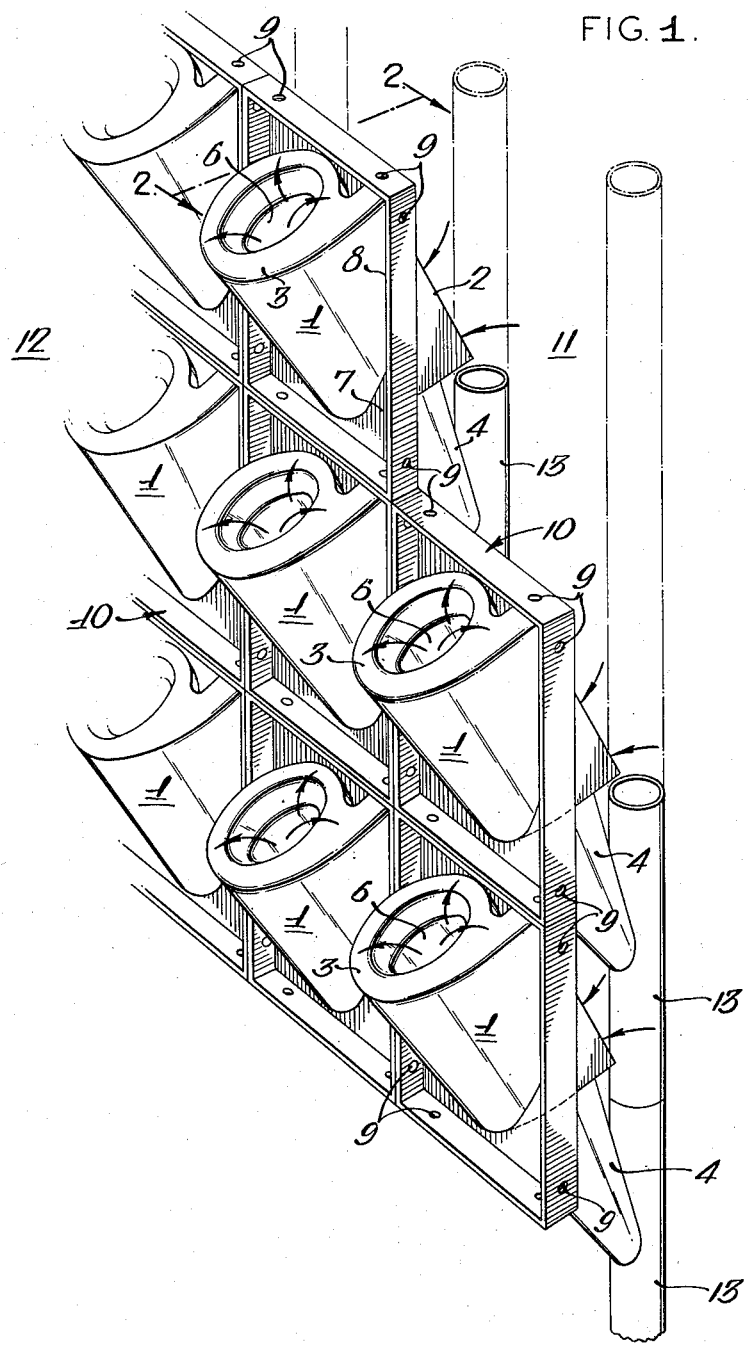

United States Patent Office 2,848,061
Patented Aug. 19, 1958

2,848,061

DUST SEPARATING AGGREGATE OF SMALL-CYCLONES

Claes Allander, Sodra-Angby, and Bengt Lanne, Jonkoping, Sweden, assignors to A B Svenska Flaktfabriken, Kungsgatan, Stockholm, Sweden Application October 22, 1956, Serial No. 617,543

Claims priority, application Sweden October 27, 1955

4 Claims. (Cl. 183—34)

The present invention relates to improved dust separating aggregates for cleaning dust-laden gaseous media.

The separating units of the aggregates take the form of small-cyclones arranged side-by-side and top-to-bottom between common inlet and outlet chambers for said media. The cyclones consist of a cylindrical casing having at one end a preferably tangential raw-gas inlet and at the other end continuing as a conically contracting lower part terminating in a dust outlet. A central tube is arranged coaxially in the cylindrical portion of the casing as a clean gas outlet. In prior art aggregates of this type, the mounting of the cyclones and connecting them to the wall separating the inlet and the outlet chamber, have proved to be expensive and time consuming. The invention provides a simple and suitable arrangement for assembling such small-cyclones into aggregates of any desired size.

A dust separating aggregate according to the invention is characterized in that the dust outlet of each separating unit leads into a pipe having a length corresponding to the vertical spacing of the separate cyclones. The pipes, when the cyclones are assembled, constitute a substantially vertical outlet pipe for dust from all of the cyclones located in each vertical row.

In accordance with the invention, the assembly of the units is further simplified by forming each separate cyclone with a flanged disc surrounding the cylindrical casing which, upon assembly of the cyclones, forms the wall separating the inlet and outlet chambers. The dust outlet pipe is arranged parallel to and has the same height as the disc.

With the foregoing in mind, a primary object of the present invention therefore is to provide an improved structure for mounting a plurality of dust separating cyclones.

The invention will now be described in detail with reference to the accompanying drawings wherein:

Fig. 1 is a fragmentary perspective view of a structure embodying the present invention;

Fig. 2 is a vertical transverse sectional view taken on the line 2—2 of Fig. 1;

Fig. 3 is a horizontal sectional view taken on the line 3—3 of Fig. 2;

Fig. 4 is a view similar to Fig. 3 showing a structure embodying twin-cyclones within the scope of the present invention; and Fig. 5 is a fragmentary elevation of the structure shown in Fig. 4 as seen from the left hand side of the figure.

In the drawings, a number of small-cyclones 1 are arranged side-by-side and top-to-bottom in a wall 10 between an inlet chamber 11 for raw-gas and an outlet chamber 12 for clean-gas. Each of the cyclones consists of a cylindrical casing 3 at its upper part having a tangential raw-gas inlet 2. A conically contracting lower part 4 of the casing is provided with a dust outlet 5. A coaxially arranged central tube 6 is used as a clean-gas outlet for each of the cyclones. An outer flange or disc 7 is joined with the cylindrical casing 3 and comprises a rectangular disc forming a given angle with the longitudinal axis of the cyclone, which in the drawing is designated $\alpha^0$. Along its outer periphery the disc is provided wtih joining flanges 8, which may have holes 9 for bolts to make it possible to assemble the cyclones into units of any desired size. By assembling the cyclones in this manner, the separating wall 10 between the inlet and outlet chambers is formed automatically.

In accordance with the invention, the cyclones are provided with open-ended pipe sections 13 connected to the conical part 4. The sections are parallel to and have the same height as the disc 7 surrounding the cylindrical casing. During the assembly of the cyclones, the pipe sections are longitudinally abutted and form a substantially continuous vertical outlet pipe for dust from all the cyclones in one vertical row.

The above-described embodiment of the invention may be modified by substituting for the single cyclones 1, two united, parallel-working small-cyclones, such as shown in Figs. 4 and 5. In these figures, the twin cyclones 21 consist of cylindrical casings 23, 23 having a common raw gas inlet at 22 and having their outlets 25, 25 connected to a common dust outlet pipe 26 similar to the pipes 13. The twin cyclone 21 is mounted in a flange or disc 27 having joining flanges 28. The units composed of the twin cyclone 21, common dust outlet pipe 26, and disc and flange 27 and 28, may be assembled similarly to the single cyclone units to form a separating wall similar to the walls 10.

While particular embodiments of the present invention have been herein illustrated and described, it is not intended to limit the invention to such disclosure, but changes and modifications may be made therein and thereto within the scope of the following claims.

What we claim is:

1. A multiple-cyclone dust-separating aggregate in a partition between a common inlet chamber for raw-gas and a common outlet chamber for clean-gas of said aggregate, and consisting of a number of cyclone units arranged in vertical and horizontal rows, said units in each vertical row being spaced a given vertical distance, each of said cyclone units comprising at least one casing having a cylindrical upper part having a tangential raw-gas inlet open to one side of said partition and a conically-tapered lower part terminating in a dust outlet, a central tube coaxially arranged in the cylindrical upper part as a clean-gas outlet open to the other side of said partition, and a vertical open-ended pipe integral with the unit having a length corresponding to the vertical spacing of said units, the dust outlet of each unit terminating in a wall opening of said pipe, the pipes of the units in each vertical row being in endwise abutting vertical alignment to constitute a common vertical outlet conduit for dust, each cyclone unit also being provided with an outwardly projecting vertical member constituting a rectangular disc angularly disposed with respect to the longitudinal axis of the casing, the vertical and horizontal dimensions of said disc corresponding to the vertical and horizontal spacing between adjacent rows of units, said discs having joining means for fastening the units together to form an aggregate of any desired size, the discs constituting the partition between the inlet and outlet chambers of the separating aggregate.

2. A dust separating aggregate according to claim 1 wherein each of said cyclone units consists of a single casing mounted with its longitudinal axis disposed angularly to the vertical.

3. A dust separating aggregate according to claim 1 wherein each said cyclone unit comprises two similar casings having the raw-gas inlets thereof merging into a common orifice open to said one side of the partition and having the dust outlets thereof terminating in wall openings of a common vertical open-ended pipe.

4. A multiple-cyclone dust-separating aggregate forming at least one common outlet conduit for dust and a common partition parallel to said conduit between a common inlet chamber for raw gas and a common outlet chamber for clean gas of said aggregate, said aggregate consisting of a number of individual identical cyclone units arranged in at least one row parallel to said common conduit, said units in said row being spaced a given distance, each of said cyclone units comprising at least one casing having a cylindrical upper part having a tangential raw-gas inlet open to one side of said partition and a conically tapered lower part terminating in a dust outlet, a central tube coaxially arranged in the cylindrical upper part of a clean-gas outlet open to the other side of said partition, and an open-ended pipe integral with the unit having a length corresponding to the spacing of said units, the dust outlet of each unit terminating in a wall opening of said pipe, the pipes of the unit in said row being in endwise abutting alignment to constitute said common outlet conduit for dust, each cyclone unit also being provided with an outwardly projecting disc member parallel to said pipe and having joining means for fastening the units together to form an aggregate of any desired size, the disc members constituting the common partition between the inlet and outlet chambers of the separating aggregate.

References Cited in the file of this patent
UNITED STATES PATENTS

| | | |
|---|---|---|
| 461,801 | Radkey | Oct. 20, 1891 |
| 2,533,991 | Blomquist et al. | Dec. 12, 1950 |
| 2,643,737 | Bowers et al. | June 30, 1953 |

FOREIGN PATENTS

| | | |
|---|---|---|
| 849,507 | Germany | Dec. 8, 1952 |
| 1,090,290 | France | Oct. 13, 1954 |